Patented Feb. 19, 1935

1,991,367

UNITED STATES PATENT OFFICE 1,991,367

PRODUCTION OF VULCANIZABLE MIXTURES

Arthur Beck and Martin Mueller-Cunradi, Ludwigshafen-on-the-Rhine, Germany, assignors to I. G. Farbenindustrie Aktiengesellschaft, Frankfort-on-the-Main, Germany No Drawing. Application April 13, 1931, Serial No. 529,798. In Germany April 24, 1930

7 Claims. (Cl. 106—23)

The present invention relates to the production of vulcanizable mixtures.

It has hitherto been the practice to mix synthetic substances of rubber-like nature with the additions required for their vulcanization, in mixing rollers, rubber-kneading machines and the like. The amount of power required for this operation is very considerable, and, usually, even greater than is needed for mixtures of India rubber.

We have now found that compounded mixtures for vulcanization and consisting of rubber-like polymerization products of diolefines, or mixtures thereof with other polymerizable hydrocarbons such as styrene, and the additions necessary or employed for vulcanization, can be prepared by incorporating the whole or a part of these additions, especially the voluminous additions of fillers, with a colloidally dispersed polymerization product of the said nature, that is to say, a dispersion of the from viscous to semi-solid polymerization product in a liquid in which it does not dissolve, as for example in water or in liquid alcohols or ketones. This can be effected by simple stirring, or other similar operation requiring but little power such as kneading, and subsequent precipitation of the whole in any known and convenient manner, as for example by electro-phoresis, heat or preferably with the aid of acids which do not chemically attack the polymerization products such as strong acids of organic or inorganic nature as for example acetic, formic, sulphuric, hydrochloric or phosphoric acids. According to the said process compounded vulcanizable mixtures of the most perfect homogeneity can be obtained with a minimum expenditure of time and power and in the simplest form of apparatus. This new method of incorporating the additions is particularly facilitated by the emulsifying agents usually present in aqueous dispersions of the polymerization products from the production of the colloidal dispersions, the said agents having an extremely favorable influence in respect of the wetting of most pulverulent additions, such as sulphur, vulcanization accelerators, metal oxides such as zinc oxide or lead oxide, lampblack and like fillers or coloring materials. The said emulsifying agents may be chosen from soaps, Turkey-red oils or other sulphonation products of organic compounds of high molecular weight as for example alkylnaphthalene sulphonic acid salts, palmitic sulphonic acid salts, or from saponin, cholates, glue, casein, milk and the like. The additions may also be wetted with a small quantity of the dispersions or with solutions of the said emulsifying agents prior to mixing, thereby still further improving their fineness of distribution. Finally, all or part of these additions—especially those not in pulverulent form, such as asphalts, resins, fatty acids, oils and the like, employed as plasticizing agents—may be added, in the form of separately prepared emulsions, to the colloidal dispersion of the polymerizate, and, if desired, be also mixed with a rubber latex of natural origin.

By the process according to the present invention the difficult mastication of the polymerization products in the compounding process is avoided and the products are more homogeneous, especially owing to the lack of over- or undermasticated portions, and any tacky products are avoided which frequently occur on working with the said polymerization products.

The quantity of filler such as lampblack of any origin, zinc oxide or mixtures of both is generally from 20 to 80 per cent of the polymerization product depending on the purpose for which the vulcanizable mixtures are intended. Sulphur materials for vulcanizing such as sulphur, thiouram sulphides or mixtures of both, or alkali metal or alkaline earth metal polysulphides are generally employed in quantities of from 0.5 to 60 per cent of the said polymerization products, soft rubber articles requiring usually from 0.6 to 5 per cent.

After the precipitation the mixed coagulate is preferably freed from the dispersing medium of the dispersions, such as water, for example by squeezing between washing rollers, washed with water and finally dried at temperatures not exceeding 100° C. preferably at between 50° and 70° C.

The following example will further illustrate the nature of this invention, but the invention is not restricted to this example. The parts are by weight.

*Example*

2000 parts of a liquid of the character of rubber latex, which have been prepared by polymerizing an aqueous emulsion of butadiene in the presence of about 10 per cent by weight of butadiene of ammonium oleate with the aid of 2 per cent of an aqueous 10 per cent hydrogen peroxide solution, and containing 10 per cent of polymerization product, are stirred for 15 minutes with 4 parts of sulphur, 8 parts of di-cyclohexylamine dithiocarbamic di-cyclohexylamine and 140 parts of American gas black, these additions having first been wetted with some quantity of the above latex liquid. The mixture which is still dispersed is then coagulated with acetic acid, the coagulate is washed in the washing roller and is finally dried at a temperature not exceeding 100° C. Vulcanization products with excellent mechanical properties can be obtained by heat-pressing the said mixture for 60 minutes at 151° C., if desired after adding about 10 parts each of colophony and of the oily, bituminous softener traded under the name of "Kautschol".

What we claim is:—

1. The process for the production of vulcanizable mixtures which comprises incorporating a colloidal aqueous dispersion resulting from the polymerization of a diolefine in aqueous emulsions with carbon black without coagulation of the polymerized diolefine and then precipitating the said polymerization product together with the carbon black.

2. The process according to the preceding claim in which the precipitation is effected by the addition to the aqueous dispersion of carbon black and polymerized diolefine of an acid chemically inert to the polymerization product.

3. The process according to claim 1 in which the quantity of carbon black added is from 20 to 80 per cent of the polymerized diolefine contained in the aqueous dispersion.

4. The process according to claim 1 in which the diolefine referred to is butadiene.

5. The process according to claim 1 in which the carbon black is first wetted with a small quantity of the colloidal aqueous dispersion of the polymerized diolefine before being added to the main body of said aqueous dispersion.

6. The process for the production of vulcanizable mixtures which comprises incorporating a colloidal aqueous dispersion resulting from the polymerization of a diolefine in aqueous emulsion with carbon black and a sulphur material capable of vulcanizing rubber, without coagulation of the polymerized diolefine, and then precipitating the said polymerization product together with the carbon black and the sulphur material.

7. The process according to the preceding claim in which the amount of carbon black employed is from 20 to 80 per cent of the polymerized diolefine and the amount of sulphur material employed is from .5 to 60 per cent of the polymerized diolefine.

ARTHUR BECK.
MARTIN MUELLER-CUNRADI.